United States Patent
Gordon

(10) Patent No.: US 6,818,866 B2
(45) Date of Patent: Nov. 16, 2004

(54) LIQUID HEATING VESSEL

(75) Inventor: Stewart Gordon, Saddleworth (GB)

(73) Assignee: Pulse Home Products Limited, Oldham (GB)

( * ) Notice: Subject to any disclaimer, the term of this patent is extended or adjusted under 35 U.S.C. 154(b) by 0 days.

(21) Appl. No.: 10/362,577

(22) PCT Filed: May 22, 2001

(86) PCT No.: PCT/GB01/02254

§ 371 (c)(1),
(2), (4) Date: Mar. 27, 2003

(87) PCT Pub. No.: WO02/32277

PCT Pub. Date: Apr. 25, 2002

(65) Prior Publication Data

US 2003/0164364 A1 Sep. 4, 2003

(51) Int. Cl.[7] ..................... A47J 31/154; A47J 31/156; A47J 31/158
(52) U.S. Cl. .......................... 219/438; 219/429; 99/285

(58) Field of Search ................................ 219/506, 438, 219/445.1, 429; 99/285, 342, 344

(56) References Cited

U.S. PATENT DOCUMENTS

| | | | | |
|---|---|---|---|---|
| 4,163,895 A | * | 8/1979 | Hauser et al. | 392/333 |
| 6,626,857 B1 | * | 9/2003 | Ohta et al. | 604/6.13 |
| 2003/0164370 A1 | * | 9/2003 | Aihara et al. | 219/622 |

FOREIGN PATENT DOCUMENTS

| | | | |
|---|---|---|---|
| DE | 19903587 A1 | * | 8/2000 |
| GB | 2 312 153 | | 10/1997 |
| JP | 09117370 A | * | 5/1997 |
| WO | WO 00/24300 | | 5/2000 |

* cited by examiner

Primary Examiner—Joseph Pelham
(74) Attorney, Agent, or Firm—Nixon & Vanderhye P.C.

(57) ABSTRACT

A kettle (10) is provided with LEDs (30) in the base (19) of the kettle that project through holes (18) or groups of holes (36) directly on to a power supply stand (16) to provide an indication that the kettle is switched on and yield a pleasing aesthetic effect.

15 Claims, 4 Drawing Sheets

LIQUID HEATING VESSEL

This application is the US national phase of international application PCT/GB01/02254, filed in English on May 22, 2001 which is designated the US. PCT/GB01/02254 claims priority to GB Application No. 0025794.9 filed Oct. 20, 2000. The entire contents of these applications are incorporated herein by reference.

This invention relates to the field of liquid heating vessels in general, but is particularly suited to kettles.

It is known in liquid heating vessels, such as kettles, to provide a means of illumination circumferentially around the liquid heating vessel so that the operational condition of the kettle is visible to a user from any direction.

UK patent application GB-A-2,312,153 discloses a kettle with a housing, wherein a light emitting device is located within the bottom of the housing. Light is guided from the light emitting device by an optical conductor to be visible circumferentially of the housing.

International patent application WO-A-00/24300 also discloses a kettle which has a light emitting device located within the bottom of a housing. Light is guided from the light emitting device by a moulded plate to be visible circumferentially of the housing.

Both of the above inventions require complex mouldings and extra components to provide a means of guiding the light from the light emitting devices to the circumference of the kettle. The complex mouldings and extra components contained within the above kettles add to the cost and complexity of their manufacture.

According to the present invention there is provided a liquid heating vessel comprising:
 a housing; and
 one or more light emitting devices disposed within said housing and positioned relative to respective holes in said housing such that, in use, said one or more light emitting devices project light through said holes onto a surface outside of said housing, said light being reflected from said surface outside of said housing to be visible to a user.

Because the light emitting devices are positioned to project light directly through the holes there is no requirement for any device or structure that has the function of guiding or conducting the emitted light to the holes. This arrangement gives the advantage of reducing the complexity and cost of manufacture of the liquid heating vessel.

The light could be protected on to any surface outside of the vessel, such as a wall or work surface. However in accordance with preferred embodiments, the light is reflected from an outer surface of the housing. Reflecting the light that exits the holes from an outer surface of the housing enables a desired visual effect to be readily achieved and provides the ability to give a patterned effect.

While it will be appreciated that the liquid heating vessel may be formed out of a single continuous part, it is preferred for the housing to comprise a main body and a stand wherein the stand is a power supply stand via which electrical power is provided to the liquid heating vessel.

While it will be appreciated that the light emitting devices may be placed in the stand, preferred embodiments of the invention recognize that the cabling from the activating switch in the handle to the light emitting devices can be omitted if the light emitting devices are placed in the base portion of the main body of the liquid heating vessel, thereby reducing the complexity and the cost of manufacture of the liquid heating vessel.

A pleasant aesthetic effect can be achieved if light radiates circumferentially from the bottom of the liquid heating vessel. To accomplish this light, emitting devices may be deployed in the base of the main body so that they project light out of the holes in the base of the main body that is then reflected by the outer surface of the stand to be visible to the user.

While it will be appreciated that the light emitting devices could take many different forms, e.g. neon bulbs, incandescent bulbs or light emitting diodes, the preferred light emitting device is a light emitting diode (LED). Light emitting diodes have the advantages that they are bright, reliable and have low heat output. Light emitting diodes are available that can emit light that is directed within a cone of small solid angle, which may assist the projection effect. Superluminescent light emitting diodes or lasers may be preferred as they emit very intense light compared to standard LEDs.

In preferred embodiments, the LEDs pulse in response to a predetermined operational condition of the liquid heating vessel, e.g. the LEDs can be lit continuously when the liquid heating vessel is heating a liquid to bring the liquid to a boil and the LEDs can flash when the liquid is being heated at a reduced rate to maintain the liquid temperature once the liquid has boiled.

Embodiments of the invention will now be described, by way of example only, with reference to the accompanying drawings in which.

Figure 1:
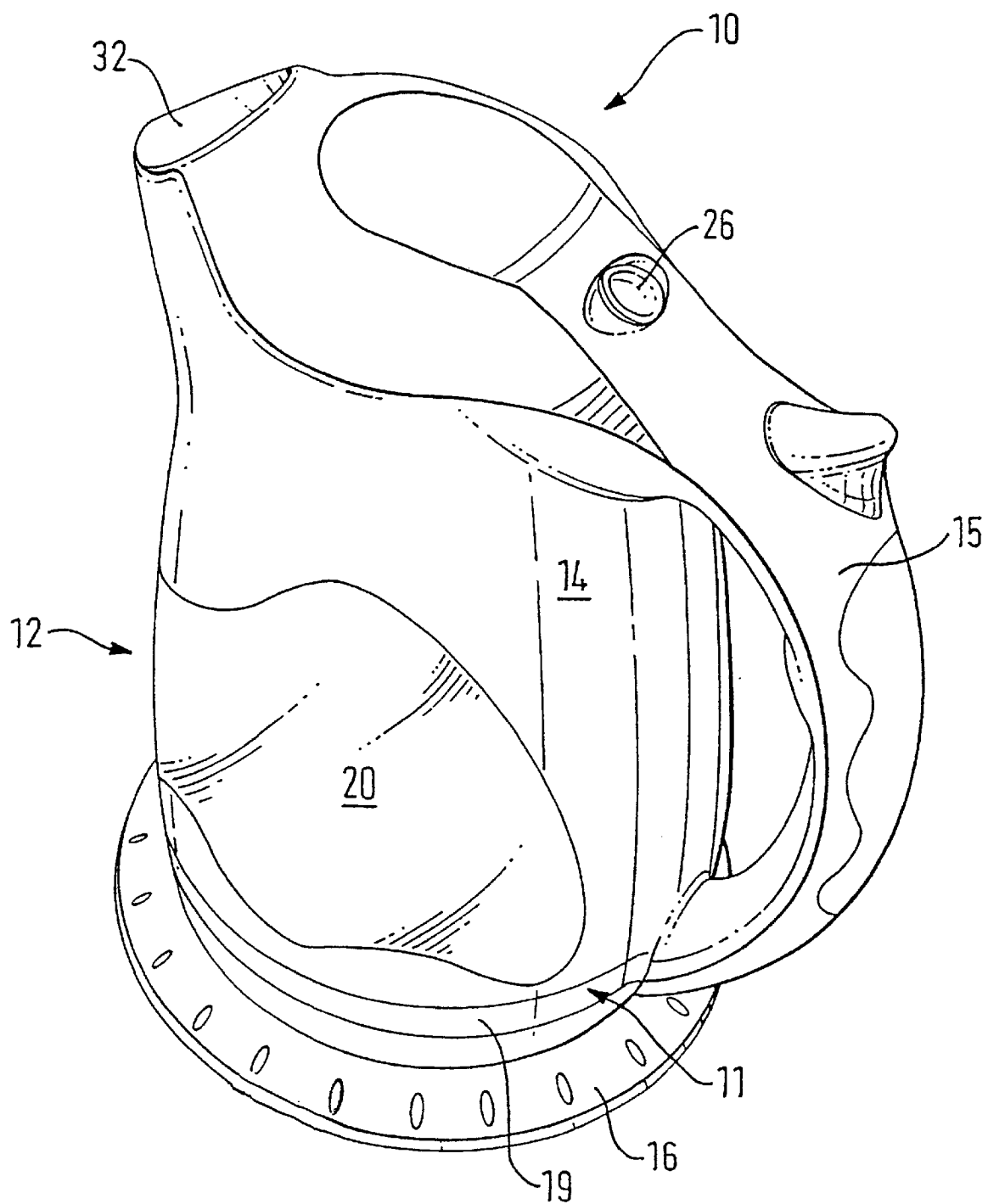
FIG. 1 shows a kettle according to a first example embodiment of the invention.

FIG. 1 shows a kettle 10 comprising of a lid 8 and a tubular housing 12. The lid 8 and tubular housing 12 are preferably formed from a plastic material, but may be readily made from glasses, ceramics, metals or a combination of any of these materials. The tubular housing 12 consists of a main body 11 set down on a stand 16. The main body is comprised of an upper portion 14 and a base portion 19. The upper portion 14 is formed to have a spout 32 and a handle 15 that are disposed opposite one another. An actuating switch 26 for the kettle 10 is arranged above the handle 15. Upper portion 15 contains a window 20 (multiple windows are also possible), which is made from a transparent or translucent material, which is preferentially plastic but could also be a glass. A number of holes 18 (not shown in FIG. 1) are positioned around the circumference of the base portion 16. The kettle 10 could have more than one switch for different operating states.

Figure 2:
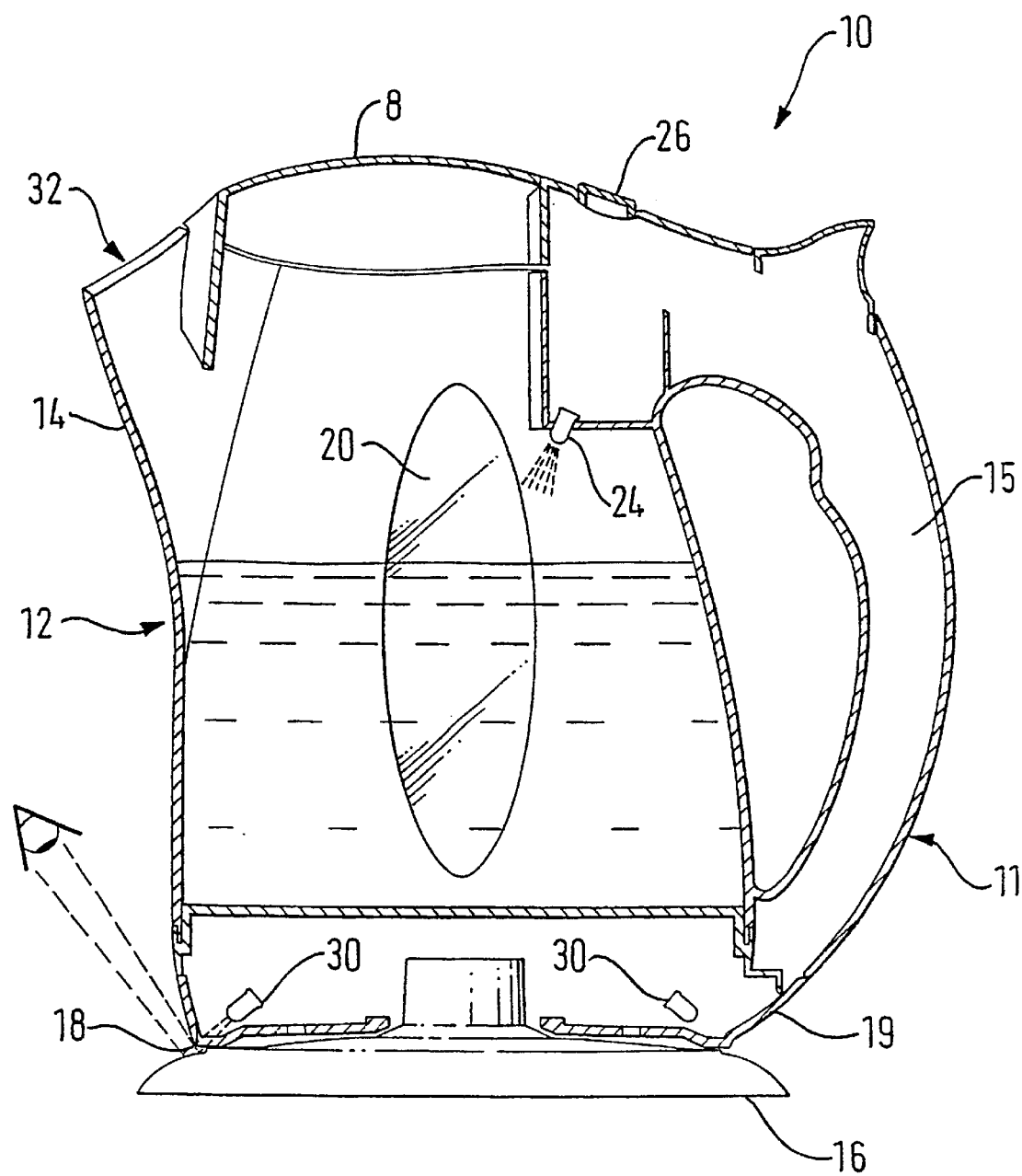
FIG. 2 is a vertical cross sectional view of the kettle of FIG. 1.

In FIG. 2 more detail of the kettle can be seen. One or more LEDs 24 are positioned substantially toward the top and on the inside of the main body 11 to provide illumination of the contents of the upper portion 14, thus providing an indication of the fluid level contained in the upper portion 14. Further LEDs 30 are positioned within base portion 19. Each LED 30 is positioned adjacent to a respective hole 18.

Figure 3:
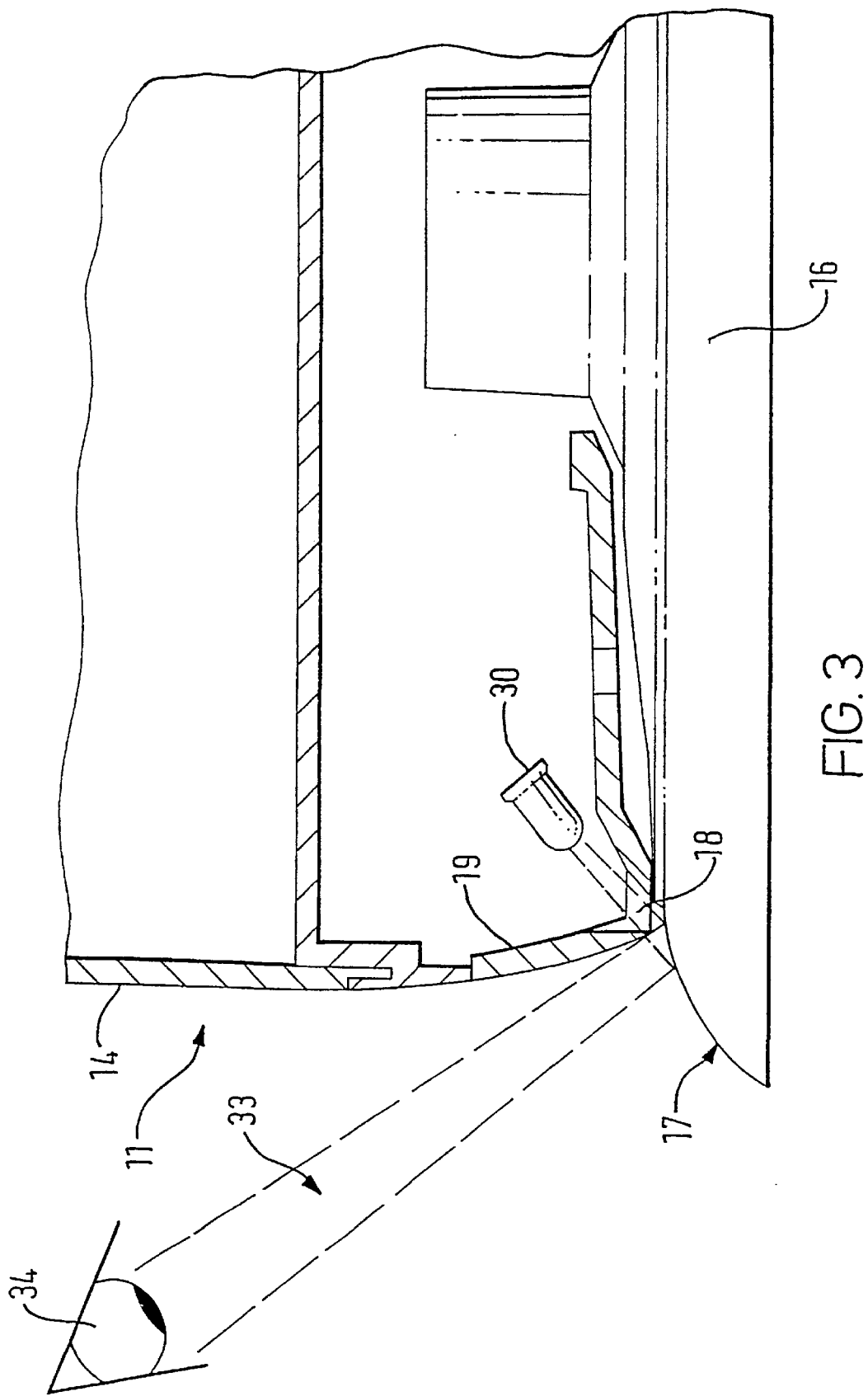
FIG. 3 is an enlarged vertical cross section of the stand and the base portion of the kettle of FIG. 1.

FIG. 3 is an enlarged cross-section of the stand 16 and main body 11. The base portion 19 of the main body 11 is downwardly conically reducing and the stand 16 is downwardly conically enlarging (i.e. extends downwardly and outwardly). The holes 18 are substantially towards the bottom of base portion 19. In operation, the LEDs 30 emit cones of light 40 which is substantially within a cone angle of 15° from the central axis of the cone. The LEDs 30 are positioned above respective holes 18 so that the cones of light 40 can directly project through respective holes 18 to be incident on the outer surface 17 of the stand 16. The light cones 40 are reflected from the outer surface of stand 16 to produce reflected light 33 that is visible to a user 34. The LEDs 30 are positioned within the base portion 19 so that there is no direct line of sight between the user 34 and the LEDs 30. The LEDs 30 are chosen to emit red or orange light so that a pleasant visual effect is achieved, namely a red or orange glow around the base will be apparent to the user, giving the impression that the kettle is being heated on a stove, hob or similar appliance. Other colours of LEDs could also be used to achieve different effects.

Figure 4:
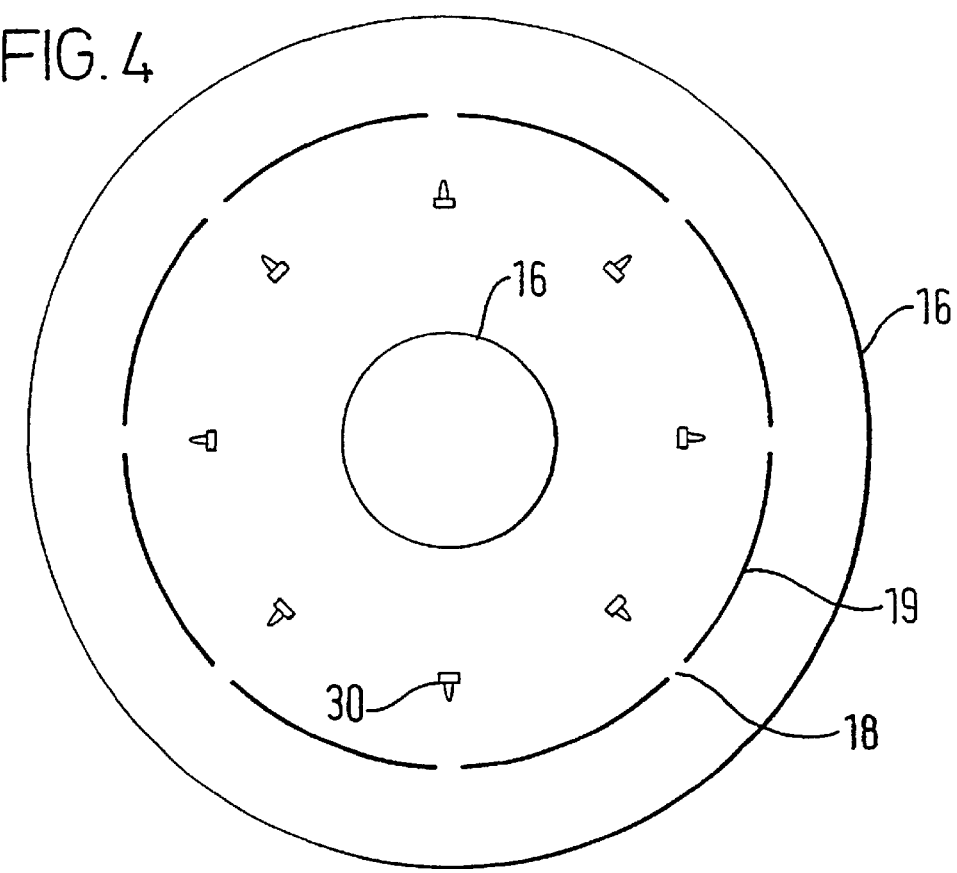
FIG. 4 is a plan view of the stand and the base portion of the kettle of FIG. 1.

FIG. 4 is a plan view of the stand 16 and the base portion 19 of the kettle 10. There are eight holes 18 positioned around the circumference of the base portion 19. Disposed within the base portion 19 are eight LEDs 30 that are positioned relative to respective holes 18.

Figure 5:
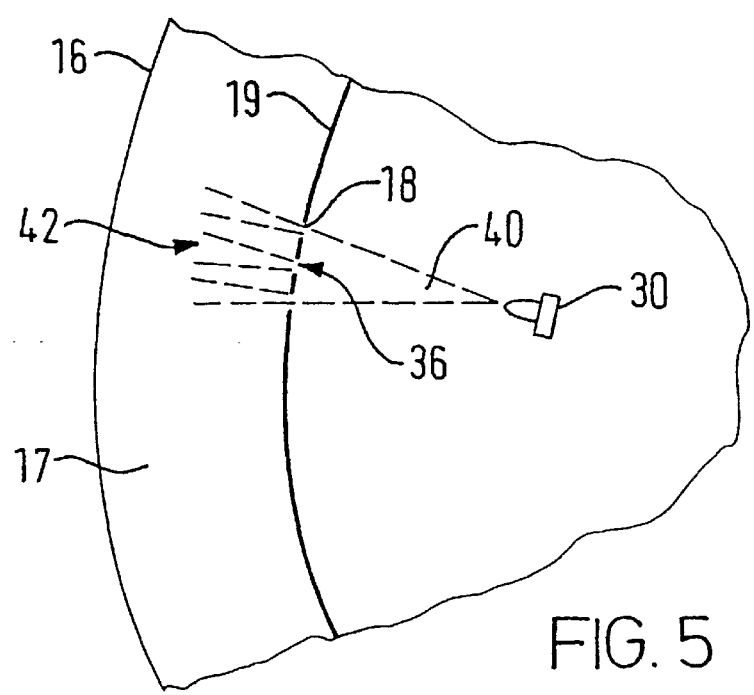
FIG. 5 is an enlarged plan view of the stand and the base portion of a kettle according to a second example embodiment.

FIG. 5 is an enlarged plan view of a portion of the stand 16 and the base portion 19 of a second embodiment of the kettle 10. In this embodiment a group of holes 36 are associated with each LED 30, the groups of holes 36 are arranged circumferentially around base portion 19. The holes 18 that form each group of holes 36 are arranged horizontally in line with one another, although many difference arrangements are possible, e.g. shaped holes projecting a shaped beam of light could be used to provide more complex visual effects, such as projecting a logo or motif. The cones of light 40 that are produced by the LEDs 30 encompass respective groups of holes 36. The light projected through the group of holes 36 is reflected from the outer surface 17 of the stand 16 to be visible to a user 34. The group of holes 36 may be arranged to give a pleasing aesthetic effect, for example if the holes 18 are arranged in groups of three associated with a LED 30 then, in operation, the kettle has the appearance that it is being heated on a halogen hob.

The LEDs 30 may be connected to a control circuit (not shown) such that they pulse in response to a pre-determined operational condition of the kettle. In one example, the LEDs 30 are continuously lit when the kettle is being operated to bring a liquid contained in the vessel to the boil and then the LEDs 30 flash once the kettle has been brought to the boil and is being heated at a reduced level to keep the liquid in the kettle hot.

In embodiments in which the light was projected onto a surface independent of the housing, such as a wall, it can be envisaged that more sophisticated operational state information such as temperature or time to boil could be projected.

What is claimed is:

1. A liquid heating vessel comprising:
   a housing; and
   one or more light emitting devices disposed within said housing and positioned relative to respective holes in said housing such that, in use, said one or more light emitting devices project light through said holes onto a surface outside of said housing, said light being reflected from said surface outside of said housing to be visible to a user.

2. A liquid heating vessel as claimed in claim 1, wherein said surface outside of said housing in an outer surface of said housing.

3. A liquid heating vessel as claimed in claim 2, wherein said housing comprises a main body and a stand, said one or more light emitting devices being disposed within said main body and said light being reflected from an outer surface of said stand.

4. A liquid heating vessel as claimed in claim 3, wherein said stand is a power supply stand via which electrical power is, in use, provided to said liquid heating vessel.

5. A liquid heating vessel as claimed in any one of claims 3 or 4, wherein said holes are in a base portion of the main body.

6. A liquid heating vessel as claimed in claim 1, wherein said holes are positioned around the circumference of the housing.

7. A liquid heating vessel as claimed in claim 1, wherein the liquid heating vessel is a kettle.

8. A liquid heating vessel as claimed in claim 1, wherein the light emitting devices, in use, emit light substantially within a cone angle of substantially 15°.

9. A liquid heating vessel as claimed in claim 1, wherein the light emitting devices are light emitting diodes.

10. A liquid heating vessel as claimed in claim 1, wherein the light emitting devices are superluminescent light emitting diodes.

11. A liquid heating vessel as claimed in claim 1, wherein the light emitting devices are lasers.

12. A liquid heating vessel as claimed in claim 1, wherein a group of holes is associated with each light emitting device.

13. A liquid heating vessel as claimed in claim 1, wherein the light emitting devices, in use, pulse in response to a predetermined operational condition of the liquid heating vessel.

14. A liquid heating vessel as claimed in claim 1, wherein said housing has a sloped outer surface extending downward and outward from said liquid heating vessel from which said light is reflected.

15. A liquid heating vessel as claimed in claim 1, wherein said light emitting devices are not directly visible when said liquid heating vessel is in use.

* * * * *